No. 762,081. PATENTED JUNE 7, 1904.
J. J. McNULTY.
HUB OR WHEEL MOUNT.
APPLICATION FILED JAN. 20, 1903.
NO MODEL.
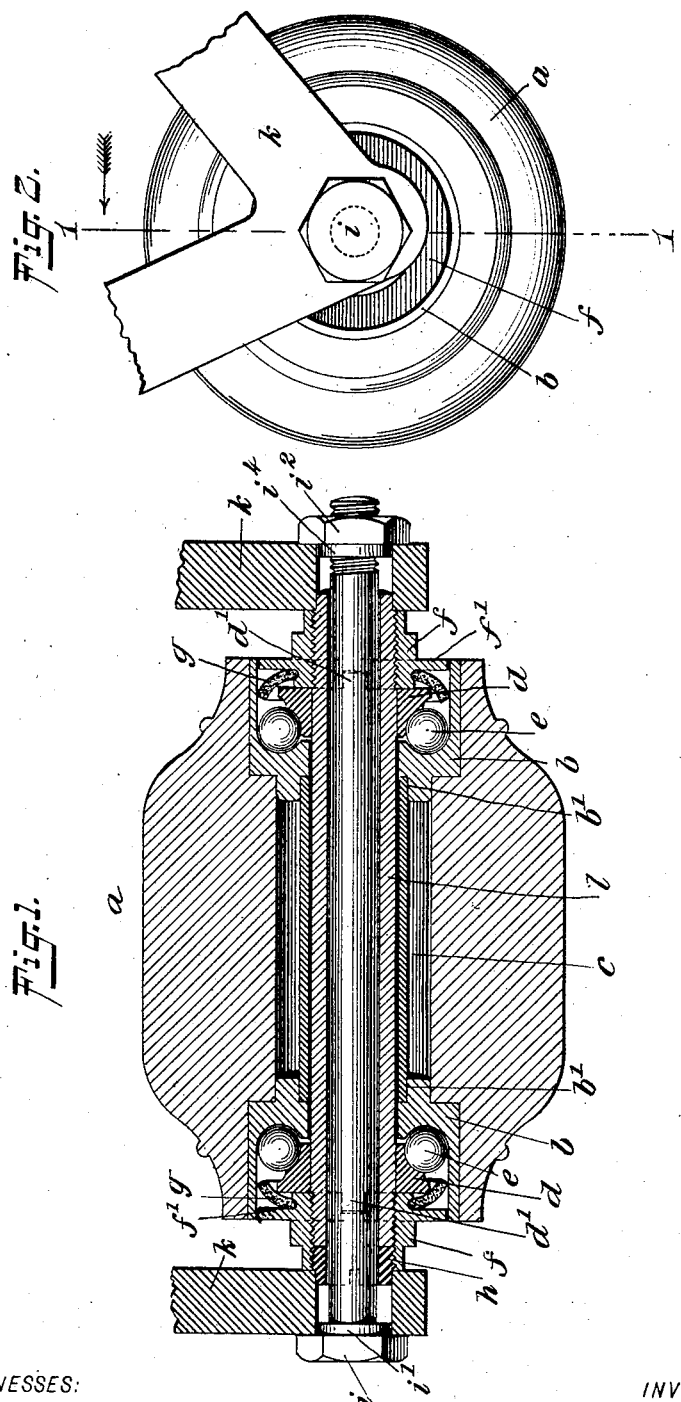
WITNESSES:
William P. Goebel.
Isaac B. Owens.
INVENTOR
John J. McNulty
BY Munn
ATTORNEYS.

No. 762,081. Patented June 7, 1904.

UNITED STATES PATENT OFFICE.

JOHN J. McNULTY, OF CARMEL, NEW YORK.

HUB OR WHEEL MOUNT.

SPECIFICATION forming part of Letters Patent No. 762,081, dated June 7, 1904.

Application filed January 20, 1903. Serial No. 139,826. (No model.)

*To all whom it may concern:*

Be it known that I, JOHN J. McNULTY, a citizen of the United States, and a resident of Carmel, in the county of Putnam and State of New York, have invented a new and Improved Hub or Wheel Mount, of which the following is a full, clear, and exact description.

This invention relates to a means for mounting the hubs of wheels, particularly the wooden hubs of horse-drawn vehicles, although it will be obvious to skilled mechanics that the invention may be put to various other uses.

My invention lies in the provision of a tubular axle for the hub and in the peculiar combination with this axle of a tie rod or bolt which is passed through the tubular axle and through the fork or other part of the vehicle-frame on which the wheel is mounted. By this arrangement upon taking out the tie-rod the wheel may be readily removed from the fork without danger of displacing any of the bearing-balls or other parts of the structure, excepting, of course, the tie-rod.

Various other features of construction and organization are involved in my invention, and all will be clearly set forth hereinafter.

This specification is an exact description of one example of my invention, while the claims define the actual scope thereof.

Reference is to be had to the accompanying drawings, forming a part of this specification, in which similar characters of reference indicate corresponding parts in both views.

Figure 1 is a longitudinal section of the hub, taken on the line 1 1 of Fig. 2; and Fig. 2 is an end elevation thereof.

$a$ indicates the hub, which according to the construction here shown is supposed to be of wood, and $b$ indicates the ball-cups, which are placed in the ends of the hub and are formed with annular seats $b'$, in which are placed the ends of the sleeve or bushing $c$, which extends axially through the hub and forms a rigid and absolutely non-collapsible connection between the two ball-cups.

$d$ indicates the ball-cones, and $e$ the balls.

$l$ indicates the tubular axle, which passes through the sleeve $c$, and on which the parts $d$ are loosely mounted. This tubular axle $l$ extends entirely through the hub structure and carries at its respective ends the nuts $f$, which are threaded thereon and serve to hold the cones $d$ in place. These nuts $f$ have circular flanges $f'$, which fit, respectively, into the outer ends of the ball-cups $b$ and close the same against the entry of dust and other foreign matter. To further insure the cleanliness of the bearing, I provide the dust-guards $g$, which are in the form of annular fabric washers and are sprung into annular grooves formed in the nuts $f$ inward from their flanges $f'$, these dust-guards $g$ being closed over the outer ends of the ball-cones $d$ and contacting with the inner walls of the ball-cups $b$. Each ball-cone $d$ is formed with one or more keys $d'$ thereon, and these are received in corresponding recesses formed in the nuts $f$. This effects a snug connection between the parts and holds the cones $d$ fast on the tubular axle $l$. The left-hand end of the tubular axle is shortened with respect to the adjacent nut $f$, and in the outer end of the left-hand nut $f$ is screwed a lock-nut $h$, which abuts firmly against the end of the axle $l$ and forms virtually a continuation thereof.

$k$ indicates the forks or other frame part in which the wheel is mounted, and $i$ indicates the tie rod or bolt which is passed through the tubular axle $l$ and engaged with the forks $k$, as shown. These forks are orificed to receive, respectively, the right-hand end of the tubular axle $l$ and the projected portion of the lock-nut $h$, which forms a continuation of the left-hand end of the tubular axle. On the head of the bolt $i$ an annular reduction $i'$ is formed, which supports the adjacent arm of the fork, and on the nut $i^2$ of the bolt $i$ a reduction $i^4$ is formed, which serves the same purpose at the right-hand end of the fork.

Now it will be observed that by this construction the bearing may be fastened in the wooden hub so as to mount the same to turn with the least possible friction. At the same time the hub itself is not subjected to any strain other than that of the spokes. The wheel may be readily taken out of the forks by simply slipping out the tie-bolt $i$, and when so removed the various parts of the bearing are nevertheless snugly contained in the wheel.

While I have illustrated the bearing-balls in this case and the appropriately-shaped cups and cones therefor, it will nevertheless be apparent that antifriction-rollers or any other form of antifriction-bearing devices may be used instead without departing from the spirit of my invention.

Various changes in the form, proportions, and minor details of the invention may be resorted to at will without departing from the spirit and scope thereof. Hence I consider myself entitled to all such variations as may lie within the intent of my claims.

Having thus described my invention, I claim as new and desire to secure by Letters Patent—

1. The combination of two wheel-mounting vehicle parts spaced from each other and having orifices therein, a tubular axle extending between said wheel-mounting parts and having its ends respectively entered into the orifices in the wheel-mounting parts, a nut on each end of the axle, said nuts respectively engaging the inner sides of the wheel-mounting parts, a tie-rod extending through the tubular axle and connected with the wheel-mounting parts, whereby to draw them inward against the nuts, and a wheel-hub mounted on the tubular axle intermediate of the said nuts.

2. The combination of two wheel-mounting vehicle parts spaced from each other and having orifices therein, a tubular axle extending between said wheel-mounting parts, one end of the axle being fitted in the orifice of one of said wheel-mounting parts, a lock-nut forming a continuation of the other end of the tubular axle and fitted in the orifice of the other wheel-mounting part, a nut on each end of the axle and respectively engaged with the inner sides of the wheel-mounting parts, one of said nuts partly inclosing the lock-nut, a tie-rod extending through the tubular axle and lock-nut and connected with the wheel-mounting parts, whereby to draw them inward against the nuts and a wheel-hub mounted on the tubular axle intermediate of the two last-named nuts.

In testimony whereof I have signed my name to this specification in the presence of two subscribing witnesses.

JOHN J. McNULTY.

Witnesses:
J. N. WALKER,
R. B. APPEL.